United States Patent
Hoyte et al.

(10) Patent No.: US 7,113,873 B2
(45) Date of Patent: Sep. 26, 2006

(54) METHOD AND SYSTEM FOR USING EDDY CURRENT TRANSDUCERS IN PRESSURE MEASUREMENTS

(75) Inventors: Scott Mordin Hoyte, Carson City, NV (US); Richard Dale Slates, Minden, NV (US); Sherrie Ann Clark, Minden, NV (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 10/723,969

(22) Filed: Nov. 26, 2003

(65) Prior Publication Data

US 2005/0114071 A1    May 26, 2005

(51) Int. Cl.
*G06F 15/00* (2006.01)
(52) U.S. Cl. ...................................................... 702/50
(58) Field of Classification Search ................ 702/50; 73/861.02, 861.03
See application file for complete search history.

(56) References Cited

U.S. PATENT DOCUMENTS

| | | | |
|---|---|---|---|
| 4,303,885 A | 12/1981 | Davis et al. | |
| 4,322,683 A | 3/1982 | Vieira et al. | |
| 4,467,281 A | 8/1984 | Davis et al. | |
| 4,652,822 A | 3/1987 | Wallace | |
| 4,853,634 A | 8/1989 | Tornblom | |
| 4,922,201 A | 5/1990 | Vernon et al. | |
| 4,924,182 A | 5/1990 | Vernon et al. | |
| 5,182,513 A | 1/1993 | Young et al. | |
| 5,544,478 A | * 8/1996 | Shu et al. | ...................... 60/773 |
| 2002/0153880 A1 | 10/2002 | Slates | |

* cited by examiner

*Primary Examiner*—John Barlow
*Assistant Examiner*—Cindy D. Khuu
(74) *Attorney, Agent, or Firm*—Armstrong Teadale LLP

(57) ABSTRACT

A method for generating a signal indicative of a pressure oscillation in a chamber is provided. The method includes sensing a pressure within the chamber, generating a signal relative to the sensed pressure, digitizing the signal, transforming the digitized signal from the time domain to the frequency domain to generate an energy spectrum, and analyzing the energy spectrum to determine an energy spike indicative of a substantially non-random component of the digitized signal.

26 Claims, 7 Drawing Sheets

METHOD AND SYSTEM FOR USING EDDY CURRENT TRANSDUCERS IN PRESSURE MEASUREMENTS

BACKGROUND OF THE INVENTION

The present invention relates generally to a digital impedance measurement system and, in particular, to a digital eddy current system used to facilitate increasing the sensitivity of pressure measurements.

Gas turbine engines typically include a compressor section, a combustor section, and at least one turbine section. The compressor compresses air, which is mixed with fuel and channeled to the combustor. The mixture is then ignited generating hot combustion gases. The combustion gases are channeled to the turbine which extracts energy from the combustion gases for powering the compressor, as well as producing useful work to power a load, such as an electrical generator, or to propel an aircraft in flight.

Gas turbine engines operate in many different operating conditions, and combustor performance facilitates engine operation over a wide range of engine operating conditions. Generally, stable combustion facilitates reducing engine blowout without sacrificing engine rated thrust or power levels. Moreover, in order to meet environmental regulations and to facilitate reducing NOx emissions, at least some known gas turbines are operated with dry low nitrous oxide (DLN) techniques wherein combustion stability also facilitates controlling nitrous oxide ($NO_x$) and carbon monoxide (CO) emissions.

At least some known DLN combustion systems utilize premixed fuel and air, and operate with lean fuel/air ratios (FAR) to facilitate reducing $NO_x$ emissions. A lean fuel/air ratio occurs when the ratio of fuel to air is below the stoichiometric value required for the fuel supplied during the present operating condition. However, one consequence of operating with the lean, premixed operation is that the combustion system may operate near a predefined lean blow out (LBO) boundary. Lean blow out or weak extinction is defined as the operating condition during which the mixture of fuel and air is no longer combustible. Moreover within premixed multi-nozzle systems, in particular for those that are piloted by a diffusion or near a stoichiometric flame, weak extinction can be defined as the point at which there is a significant drop in the combustion efficiency and/or complete extinction of the flame.

When operating with lean FAR mixtures, gas turbines may be subject to induced combustion instabilities that are measurable as pressure oscillations. Such oscillations, may be referred to as humming, and may be a precursor to LBO and overtime, may increase to a level known as howling which may cause damage to machinery. In addition, such pressure oscillations may be detectable with a pressure transducer, however the small movement (peak to peak amplitude) of the pressure transducer diaphragm, induced by the humming, in combination with any environmental noise that may be present near the combustor, makes it difficult to detect humming.

BRIEF DESCRIPTION OF THE INVENTION

In one aspect, a method for generating a signal indicative of a pressure oscillation in a chamber is provided. The method includes sensing a pressure within the chamber, generating a signal relative to the sensed pressure, digitizing the signal, transforming the digitized signal from the time domain to the frequency domain to generate an energy spectrum, and analyzing the energy spectrum to determine an energy spike indicative of a substantially non-random component of the digitized signal.

In another aspect, a system for generating a signal indicative of a pressure oscillation in a chamber is provided. The system includes a sensor positioned in fluid communication with the chamber wherein the sensor is configured to generate an output signal relative to pressure within the chamber, a sampling circuit that is configured to periodically receive the output signal and wherein the sampling circuit is configured to digitize the received signal, a Fourier transform circuit that is configured to generate an energy spectrum of the digitized signal, and an analyzer configured to process the energy spectrum to determine an energy spike indicative of a substantially non-random component of the digitized signal.

DETAILED DESCRIPTION OF THE INVENTION

Figure 1:
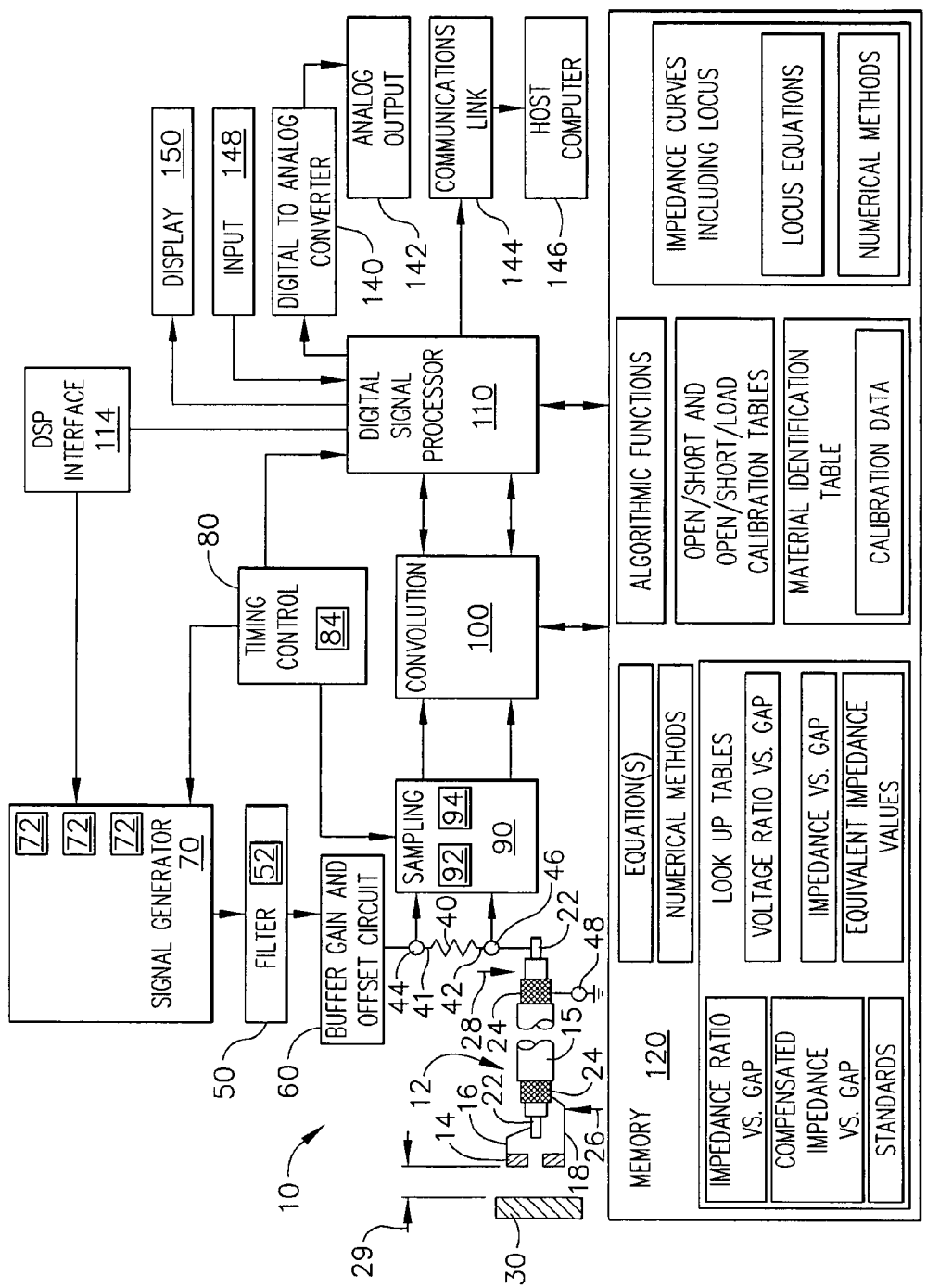
FIG. 1 is a schematic block diagram of an exemplary digital eddy current system.

FIG. 1 is a schematic block diagram of an exemplary digital eddy current system 10 that includes a transducer 12 operatively coupled to system 10. System 10 includes a voltage ratio method (VR method) used for digitally measuring an unknown electrical impedance of transducer 12. Transducer 12 includes an integral sensing element or coil 14 and a multi-conductor transducer cable 15. Sensing element 14 includes a first electrical lead 16 and a second electrical lead 18. Transducer cable 15 includes a first conductor 22 and a second conductor 24 extending from a first end 26 to a second end 28 of transducer cable 15.

At cable first end 26, first conductor 22 and second conductor 24 are each operatively coupled to the first electrical lead 16 and second electrical lead 18 of sensing element 14, respectively. At cable second end 28, first conductor 22 is coupled to second terminal 42 of resistor 40 at node 46 and second conductor 24 is coupled to ground node 48, thereby grounding one lead of the unknown dynamic transducer impedance $Z_{unknown}$.

In the exemplary embodiment, transducer 12 is coupled to a machine for sensing raw dynamic data that may be correlated to a gap distance 29 defined between transducer 12 and a conductive or metallic target 30, such as, but, not limited to a rotating shaft of the machine or an outer race of a rolling element bearing being monitored.

Digital eddy current system 10 includes a resistor 40 having a resistance value R, and a first terminal 41 and a second terminal 42 which are respectively coupled between a first node 44 and a second node 46.

Transducer 12 has an unknown dynamic transducer impedance having a value $Z_{unknown}$ and is coupled between second terminal 42 of resistor 40 at node 46 and a ground node 48. Accordingly, resistor 40 and transducer 12 form a serial electrical connection.

Digital eddy current system 10 also includes a filter 50, a signal generator 70, a timing control circuit 80, a sampling circuit 90, a convolution circuit 100 and a digital signal processor (DSP) 110. Signal generator 70 is operatively coupled to resistor first terminal 41 at node 44 through filter 50 for driving a signal through resistor 40, and transducer 12 thereby impressing a first voltage $V_1$ across serially connected resistor 40 and transducer 12, and a second voltage $V_2$ only across transducer 12. As used herein, the term "processor" also refers to microprocessors, central processing units (CPU), application specific integrated circuits (ASIC), logic circuits, and any other circuit or processor capable of executing inspection system, as described herein.

In the exemplary embodiment, signal generator 70 is operatively coupled to resistor 40 at node 44 via filter 50 and to digital signal processor (DSP) 110 for driving a programmable dynamic signal of one or more frequencies through filter 50 and the serial connection of the resistor 40/transducer 12 combination. Specifically, signal generator 70 includes a direct digital synthesis (DDS) device 72 that is operatively coupled to resistor first terminal 41 via filter 50 and buffer, gain and offset circuit 60 for driving the dynamic signal or waveform through resistor 40 and transducer 12.

This dynamic signal causes the first voltage $V_1$ to be impressed across the serial connection of resistor 40 and transducer 12 and causes the second voltage $V_2$ to be impressed only across transducer 12. In the exemplary embodiment, transducer sensing element 14 is coupled proximate target 30 such that this dynamic signal causes sensing element 14 to generate an alternating magnetic field that induces eddy currents in the metallic target 30. In turn, the eddy currents in target 30 induce a voltage in sensing element 14 and hence, a change in an impedance of transducer 12 which varies as a function of, for example, variations of gap distance 29 between transducer 12 and target 30.

In the exemplary embodiment, signal generator 70 includes a plurality of DDS devices 72 coupled to resistor first terminal 41 via filter 50 and buffer, gain and offset circuit 60 for driving a plurality of dynamic signals at different frequencies through resistor 40 and transducer 12, and subsequently performing processing including convolution for obtaining simultaneous impedance measurements of transducer 12 at different frequencies which may be correlated to gap distance 29 between transducer 12 and target 30.

Each DDS device 72 may be coupled to DSP 110 via interface 114 and generates a pure frequency/phase-programmable dynamic signal such as a sinusoidal wave. DSP 110 may include an algorithm to program both the frequency and the phase of the output signals which in turn may be used to drive transducer 12 with a frequency/phase-programmable dynamic analog signal having an output frequency/phase which may be precisely manipulated under full digital control. Therefore, each DDS device 72 may be digitally programmed to output sine waves at a plurality of frequencies/phases with precision for use as driving signals or reference signals. In one embodiment, DDS device 72 is a device such as part number AD9850 commercially available from Analog Devices, Norwood, Mass.

Filter 50 is electrically coupled between DDS device 72 and resistor 40 for filtering the analog dynamic signals output from DDS device 72. In the exemplary embodiment, filter 50 includes at least one low pass filter 52 electrically coupled between each DDS device 72 and first terminal 41 of resistor 40 to purify the output dynamic signals or waveforms of each DDS device 72 for eliminating, for example, harmonics created in DDS device 72. For example, as a result of the outputs of DDS devices 72 being ten plus bit digital to analog converters, the quantitization noise is filtered out using a low pass filter. Therefore, filters 52 remove the steps and facilitates smoothing out the analog dynamic signal outputs from DDS devices 72. Additionally, filters 52 facilitates reducing the noise bandwidth of the system 10 to improve a signal to noise ratio. In one embodiment, low pass filters 52 are five pole elliptical filter devices.

In the exemplary embodiment, buffer, gain and offset circuit 60 is electrically coupled between filter 50 and resistor 40 for buffering and amplifying the analog dynamic signals and providing any desired offset of the analog dynamic signals. Sampling circuit 90 is coupled to first node 44 for sampling and digitizing voltage $V_1$ impressed across the serially connected resistor 40/transducer 12 combination. Additionally, sampling circuit 90 is coupled to second node 46 for sampling and digitizing voltage $V_2$ that is impressed only across transducer 12. In the exemplary embodiment, sampling circuit 90 includes a pair of analog-to-digital converters (ADC) 92 and 94 coupled to first node 44 and second node 46 respectively for sampling and digitizing the first dynamic voltage $V_1$ and the second dynamic voltage $V_2$. In one embodiment, ADCs 92 and 94 are fourteen bit, wide bandwidth converters such as part number AD6644 commercially available from Analog Devices, Norwood, Mass.

Timing control circuit 80 provides synchronization between the output signal of signal generator 70 and the sampling rate of sampling circuit 90 such that the phase relationship between the output signal and samples is maintained. Timing control circuit 80 is operatively coupled to each DDS device 72, of ADCs 92 and 94, and to DSP 110. Therefore, DDS devices 72 are clocked by timing control circuit 80 such that the frequency of the output of DDS devices 72 is accurately set. Additionally, timing control circuit 80 provides synchronization between the output of DDS devices 72 and the sampling rate of ADCs 92 and 94 such that a phase relationship between the dynamic driving signal(s) and the sampled signals is maintained. Accordingly, sampling may be performed in synchrony with the dynamic driving signals.

Timing control circuit 80 includes a quartz clock oscillator 84 that is operatively coupled to each DDS device 72 for providing a clock signal to each DDS device 72.

DDS device 72 and ADC's 92 and 94 are also clocked by oscillator 84 to ensure a consistent phase between signal generator 70 and sampling circuit 90.

Convolution circuit 100 may be a stand-alone device in the form of, for example, a digital down counter (DDC). In the exemplary embodiment, convolution circuit 100 is coupled between sampling circuit 90 and DSP 110 to do the convolution operation. Analog-to-digital converted voltages $V_{1D}$ and $V_{2D}$ are received and convolved by convolution circuit 100 and then transmitted to DSP 110 as complex voltage numbers $V_{1C}$ and $V_{2C}$. Convolution circuit 100 may be programmed to process a predetermined frequency. In one embodiment, convolution circuit 100 is a digital down counter (DDC) such as part number HSP 50216, commercially available from Intersil Corporation, Milpitas, Calif.

In an alternative embodiment, digital convolution circuit 100 is integrally formed with digital signal processor 110 wherein DSP 110 is operatively coupled to ADCs 92 and 94 for receiving the first and second digitized voltage signals $V_{1D}$ and $V_{2D}$ from ADCs 92 and 94 and convolving the digitized voltages into respective complex voltage numbers $V_{1C}$ and $V_{2C}$ via integral convolution circuit 100. A DSP 110 having an integral convolution circuit 100 such as the 210XX series of devices is commercially available from Analog Devices, Norwood, Mass. The process of convolving the digitized voltages into respective complex voltage numbers $V_{1C}$ and $V_{2C}$ via convolution circuit 100 is defined as in-phase and quadrature detection or quadrature synthesis. The calculated impedance may be converted by the processor 110 into a voltage or gap value correlative to the gap distance 29 between transducer 12 and target 30 being monitored by using equation(s), algorithms, numerical methods or lookup tables stored in, for example, a memory 120 coupled to processor 110. The impedance or gap values may be outputted via a digital-to-analog converter 140 to an analog output 142. Analog output 142 may include, for example, alarms, relays, and circuit breakers that may be set to trip when the analog output is outside a predetermined nominal operating range.

The impedance or gap values may be outputted through a communications link 144 to a host computer 146 for further processing for the use of monitoring rotating or reciprocating machinery. An input 148, such as, but not limited to a keyboard, a pointing device, a voice command circuit and/or touch screen may be used to input data or modify settings of system 10 through a menu driven interface which may be viewed on a display 150. The input data may be used immediately in calculations or may be stored in memory 120 for later use. Display 150 may include, for example, a CRT or LCD monitor, and/or hardcopy device.

In operation, a radio frequency (RF) signal is transmitted from transducer coil 14 such that an RF field is created around the transducer tip. In the exemplary embodiment, the RF field extends to a gap distance 29 greater than approximately 0.1 inches (100 mils). When target 30 is present in the RF field, eddy currents flow in the surface of target 30. A penetration depth of the eddy currents depends on a conductivity and permeability of target 30. For example, the penetration depth of E4140 steel is approximately 0.003 inches (3 mils). When transducer 12 is close enough to target 30 to cause eddy currents to flow in target 30, the RF signal is affected, in that, the RF signal amplitude is at a minimum when gap distance 29 between transducer 12 and target 30 is at a minimum, resulting in a maximum of eddy current flow in target 30. Similarly, the RF signal amplitude is at a maximum when gap distance 29 between transducer 12 and target 30 is at a maximum, resulting in a minimum of eddy current in target 30. Additionally, when target 30 is moving slowly within the RF field, the RF signal amplitude increases or decreases slowly. If the target is moving rapidly within the RF field, the RF signal amplitude increases or decreases rapidly. Oscillatory movement of target 30 causes the RF signal to modulate, such as when target 30 is vibrating in relation to transducer 12.

Figure 2:
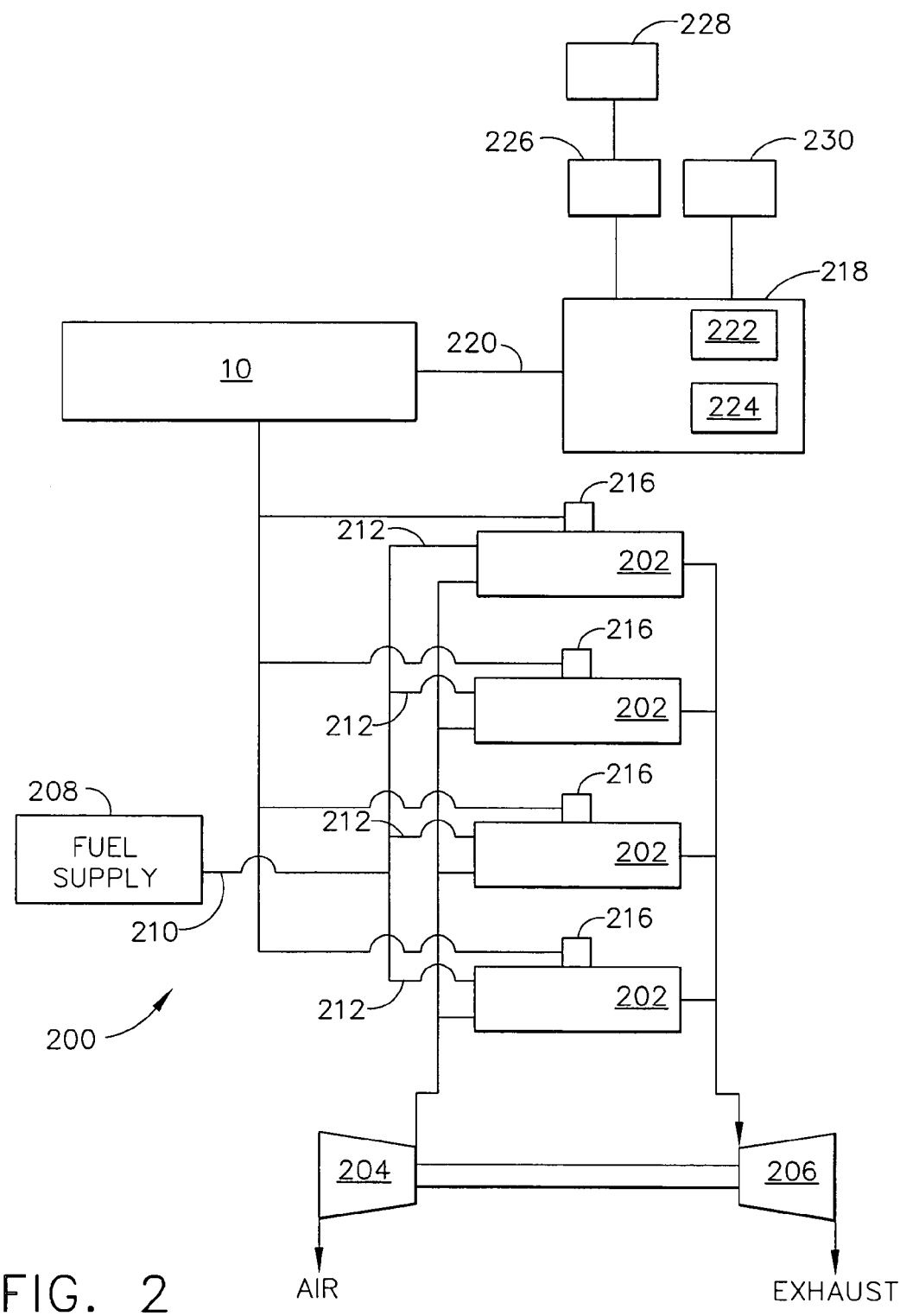
FIG. 2 is a simplified schematic illustration of a gas turbine engine that includes a plurality of annular combustors.

FIG. 2 is a simplified schematic illustration of a gas turbine engine 200 that includes a plurality of annular combustors 202. Each combustor 202 is coupled to a compressor section 204 and a turbine section 206 in a serial flow communication arrangement. A main fuel supply 208 is coupled in flow communication with each combustor 202 through a main conduit 210 and a plurality of branch conduits 212. High pressure air exiting compressor 204 is directed to each combustor such that a fuel and air mixture is supplied to each combustor 202.

A combustion sensor 216 may be positioned within one or more combustors 202 to monitor pressure fluctuations therein. In the exemplary embodiment, sensor 216 transmits signals indicative of combustion conditions within combustor 202 to digital eddy current system 10. Sensor 216 comprises a transducer 12 (Shown in FIG. 1) that is proximate target 30 (Shown in FIG. 1) such that target 30 is in pressure communication with combustor 202 and senses a static pressure, and a dynamic pressure variation within combustor 202. Transducer 12 is in RF communication with target 30 such that gap distance 29 (Shown in FIG. 1) and variations in gap distance 29 are sensed by transducer 12 as a change in impedance of transducer 12. Sensor 216 may be integrally formed from transducer 12 and target 30, or transducer 12 and target 30 may be separate components from each other. Although only four combustors 202 are shown, it should be realized that gas turbine engine 200 may include more or less than four combustors 202, depending on the engine frame size. For example, in one exemplary embodiment, gas turbine engine 200 includes twenty-four combustors 202.

Digital eddy current system 10 may be communicatively coupled to a fast-Fourier transform analyzer (FFT) 218 through a suitable conduit 220, such as but, not limited to an electrical signal cable, a fiber optic cable, or a wireless connection. In the exemplary embodiment, FFT 218 is a stand-alone component. In an alternative embodiment, the functions of FFT 218 are incorporated into digital eddy current system 10, for example as a selectably available circuit. In another embodiment, FFT 218 may be embodied in a software program executing either in a dedicated stand-alone FFT 218 or in digital eddy current system 10. In other embodiments FFT 218 may be communicatively coupled to a digital-to-analog converter 226 that converts the digital frequency spectrum into an analog signal, which may be output to an oscilloscope 228 to display the frequency spectrum as an oscilloscope trace. FFT 218 may also be communicatively coupled to a computer 230 that receives the digital data to create a graph.

In one embodiment, FFT 218 includes a processor 222 including a device 224, for example, a floppy disk drive, CD-ROM drive, DVD drive, magnetic optical disk (MOD) device, or any other digital device including a network connecting device such as an Ethernet device for reading instructions and/or data from a computer-readable medium (not shown), such as a floppy disk, a CD-ROM, a DVD or another digital source such as a network or the Internet, as well as yet to be developed digital means. In another embodiment, FFT 218 executes instructions stored in firmware (not shown). FFT 218 is programmed to perform functions described herein, and as used herein, the term processor is not limited to just those integrated circuits generally known as computers, but broadly refers to computers, processors, microcontrollers, microcomputers, programmable logic controllers, application specific integrated circuits, and other programmable circuits, and these terms are used interchangeably herein. Additionally, although the herein described methods and system are described in an industrial setting, it is contemplated that the benefits of the invention accrue to non-industrial systems such as those systems typically employed in a transportation setting such as, for example, but not limited to, aircraft.

Figure 3:
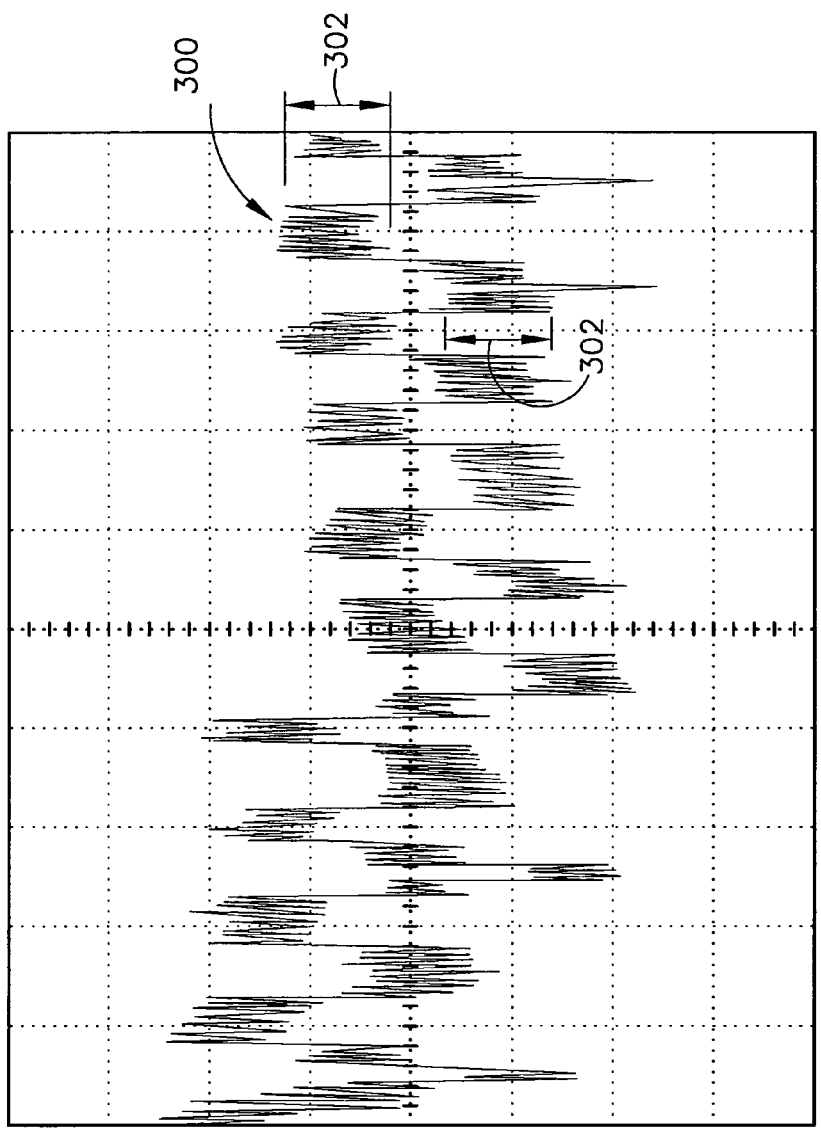
FIG. 3 is an oscilloscope trace of an output of an exemplary sensor in a pressure sensing application that may be used with the engine shown in FIG. 2.

FIG. 3 is an oscilloscope trace 300 of an output of an exemplary sensor 216 in a pressure sensing application. In the exemplary embodiment, the target material in sensor 216 is a diaphragm that is pre-selected to provide approximately 3.6 micro-inches of diaphragm displacement or deflection per psi, with some known humming events creating approximately 2–5 psi of dynamic pressure modulating a substantially higher static pressure (250–500 psi). Such a small deflection of the diaphragm may be difficult to detect on the output of sensor 216. For example, a one micro-inch displacement, which corresponds to a 0.27 psi pressure signal, with the scaling of sensor 216 set to 200 mV/mil would yield only a 0.2 mV on the output of sensor 216. Such a small signal may fall below the noise floor of system 10 and as such, may be difficult to discern. Trace 300 illustrates a time-base waveform output of sensor 216 that is oscillating with a displacement distance of approximately ten micro-inches at a frequency of 100 Hz. The oscilloscope is set to display ten milliseconds per horizontal division and one millivolt per vertical division. In the exemplary embodiment, this value of displacement corresponds to an approximate three psi oscillation in pressure within combustor 202. Trace 300 corresponds to an approximately three psi humming event. A plurality of noise traces 302 riding on trace 300 prevents the accurate determination of trace 300 amplitude and hence, prevents an accurate determination of pressure fluctuations within combustor 202. Although noise traces 302 prevents accurate determination of the amplitude of trace 300 it is possible to discern that there is a 100 Hz signal present.

Figure 4:
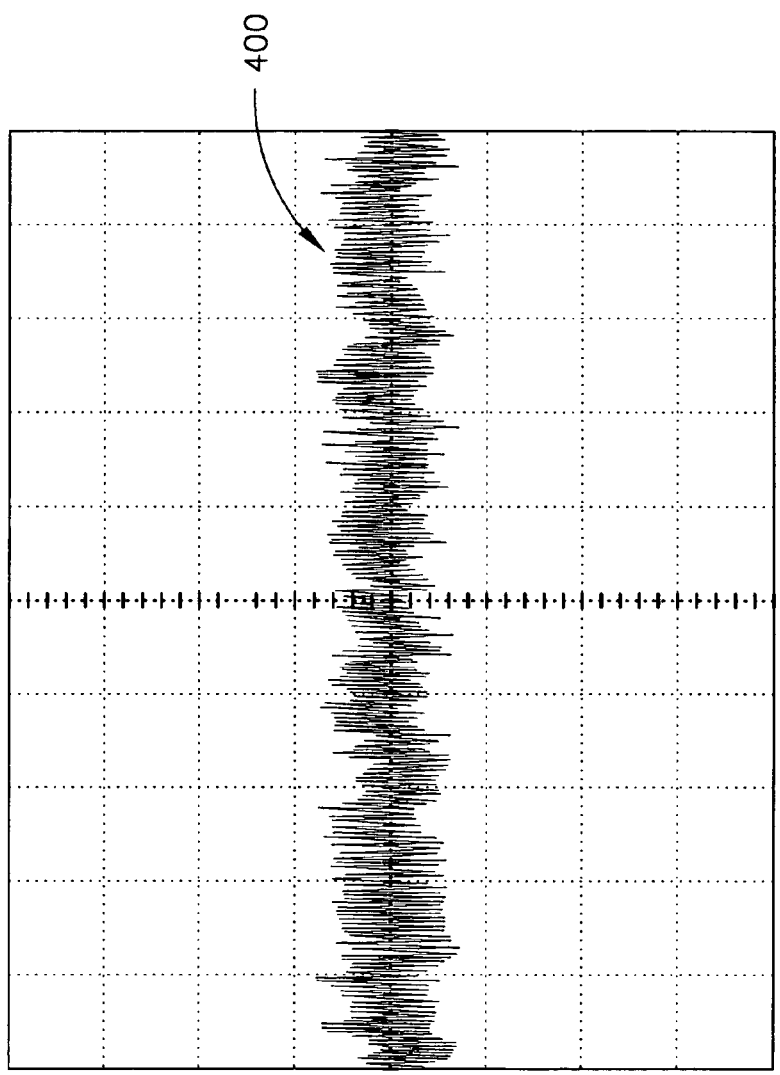
FIG. 4 is an oscilloscope trace of the sensor shown in FIG. 2 that is stimulated with an exemplary one micro-inch, 100 Hz signal.

FIG. 4 is an oscilloscope trace 400 of sensor 216 that is stimulated with a one micro-inch, 100 Hz signal. A one micro-inch signal corresponds to an approximately 0.27 psi pressure change and a 0.2 millivolt output from sensor 216. The oscilloscope is set to display ten milliseconds per horizontal division and one millivolt per vertical division. At this amplitude of signal and approximately one millivolt of noise present in system 10, there is no discernable signal that can be determined in trace 400. One millivolt of noise corresponds to approximately five micro-inches of displacement and greater than one psi within combustor 202. To discern the signal from sensor 216 from the noise, additional processing is implemented.

Figure 5:
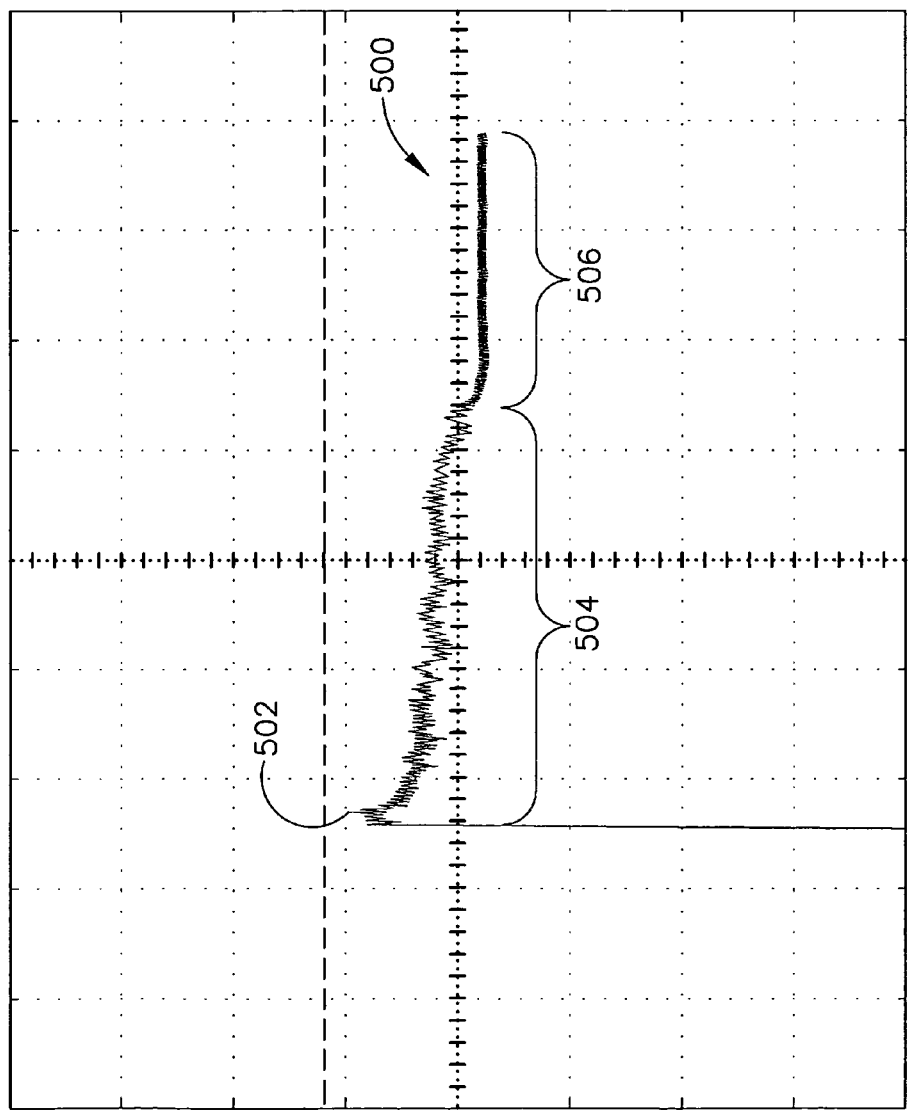
FIG. 5 is a oscilloscope trace of the output of the sensor that has been processed through real-time FFT.

FIG. 5 is a oscilloscope trace 500 of the output of sensor 216 that has been processed through real-time FFT 218 to convert the data into a frequency-domain amplitude spectrum and provide this frequency-domain amplitude spectrum to control and alarm logic circuits (not shown) to control the operation of engine 200. As used herein, real-time refers to outcomes occurring at a substantially short period after a change in the inputs affecting the outcome. The period may be the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome or may be a delay inherent in the components that comprise the system. FFT 218 enables the small displacement amplitude signal from sensor 216 to be discernible from the noise signal. The output of sensor 216 is sampled for a selectable period of time. The output waveform is applied to FFT 218. In the exemplary embodiment, FFT 218 is a 4096-point radix-4 FFT. The sample time is selectable to provide an optimal bandwidth/resolution tradeoff. Using FFT 218, components of the output signal that are non-random components may be displayed at a greater amplitude than random components because more energy at non-random frequencies is sampled than at the random frequencies. A longer sample time corresponds to a greater difference in amplitude between the random and non-random components of the signal. A peak 502 represents a real time signal for a 100 Hz, 50 micro-inch oscillatory deflection of the diaphragm of sensor 216. Peak 502 indicates more energy in the signal is present at 100 Hz than is present at other frequencies in the spectrum. A portion 504 of trace 500 represents a lower amplitude band of frequencies that make up the output signal of sensor 216 in this example. A portion 506 of trace 500 indicates noise from a band of frequencies that have been substantially filtered by a low-pass filter (not shown).

Figure 6:
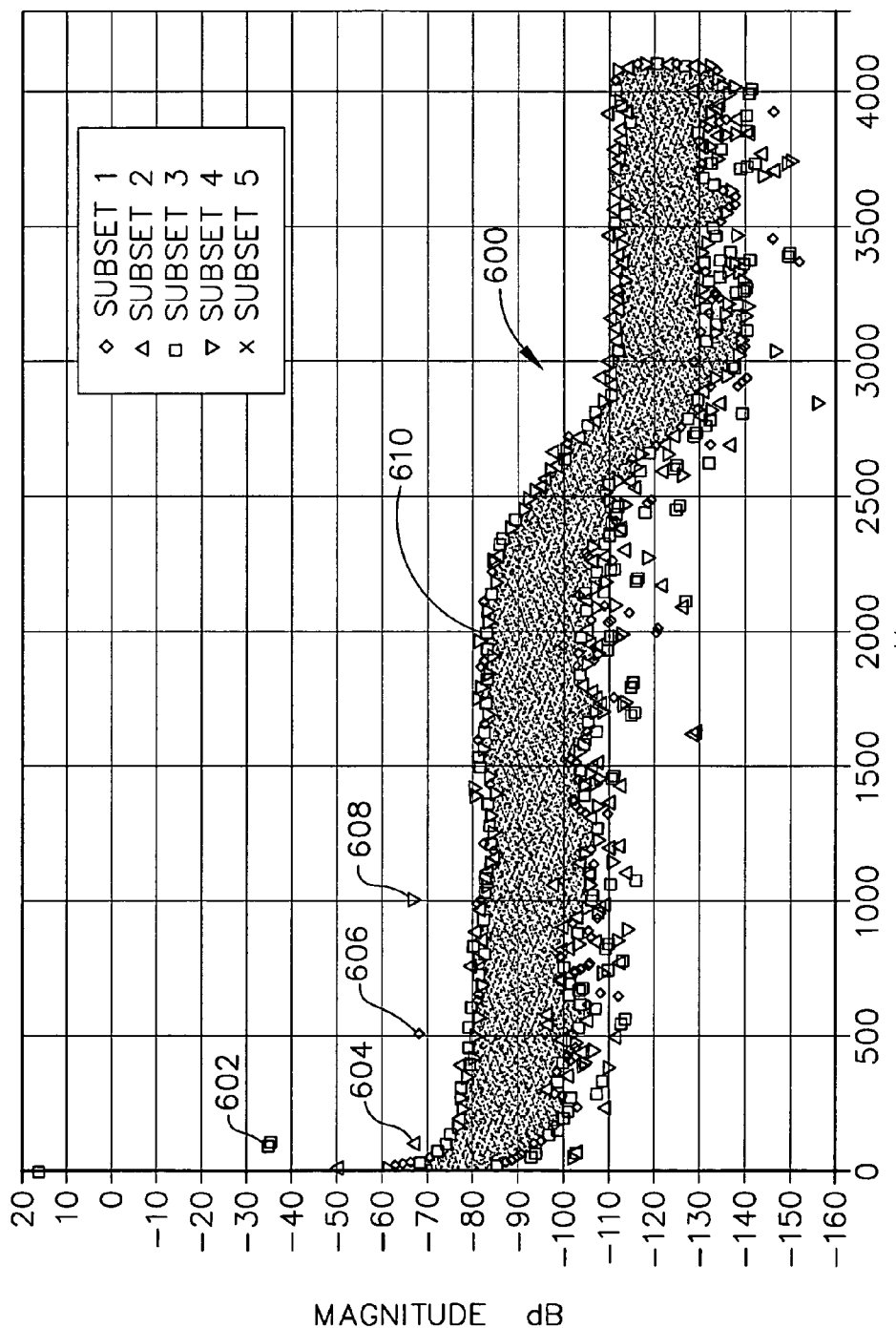
FIG. 6 is a oscilloscope trace plotted on the computer shown in FIG. 2 illustrating exemplary data collected from the sensor.

FIG. 6 is a oscillograph trace 600 plotted on computer 230 illustrating exemplary data collected from sensor 216. A point 602 represents the energy in the output signal that corresponds to a fifty micro-inch, 100 Hz component of the signal. Points 604, 606, and 608 each represents the energy in the output signal component that corresponds to a one micro-inch diaphragm displacement at 100 Hz, 500 Hz, and 1000 Hz, respectively. As shown in FIG. 4, the relatively small displacements that were indiscernible using standard processing, show clearly discernible amplitudes using FFT 218 to collect data at the non-random frequencies of 100 Hz, 500 Hz, and 1000 Hz. Each point on of trace 600 is representative of the amount of energy in the output signal at the frequency it represents. The more energy that is present at a particular frequency component, the higher the point will appear on trace 600. A baseline 610 is representative of the noise floor of approximately 1 mV peak-to-peak for system 10. Baseline 610 corresponds to portion 504 shown in FIG. 5. Point 604 corresponds to a one micro inch (0.27 psi) movement of the diaphragm, at 100 Hz. Using FFT 218 to process the output signal, point 604 represents a signal component that is 4 times in amplitude than the signal noise.

Figure 7:
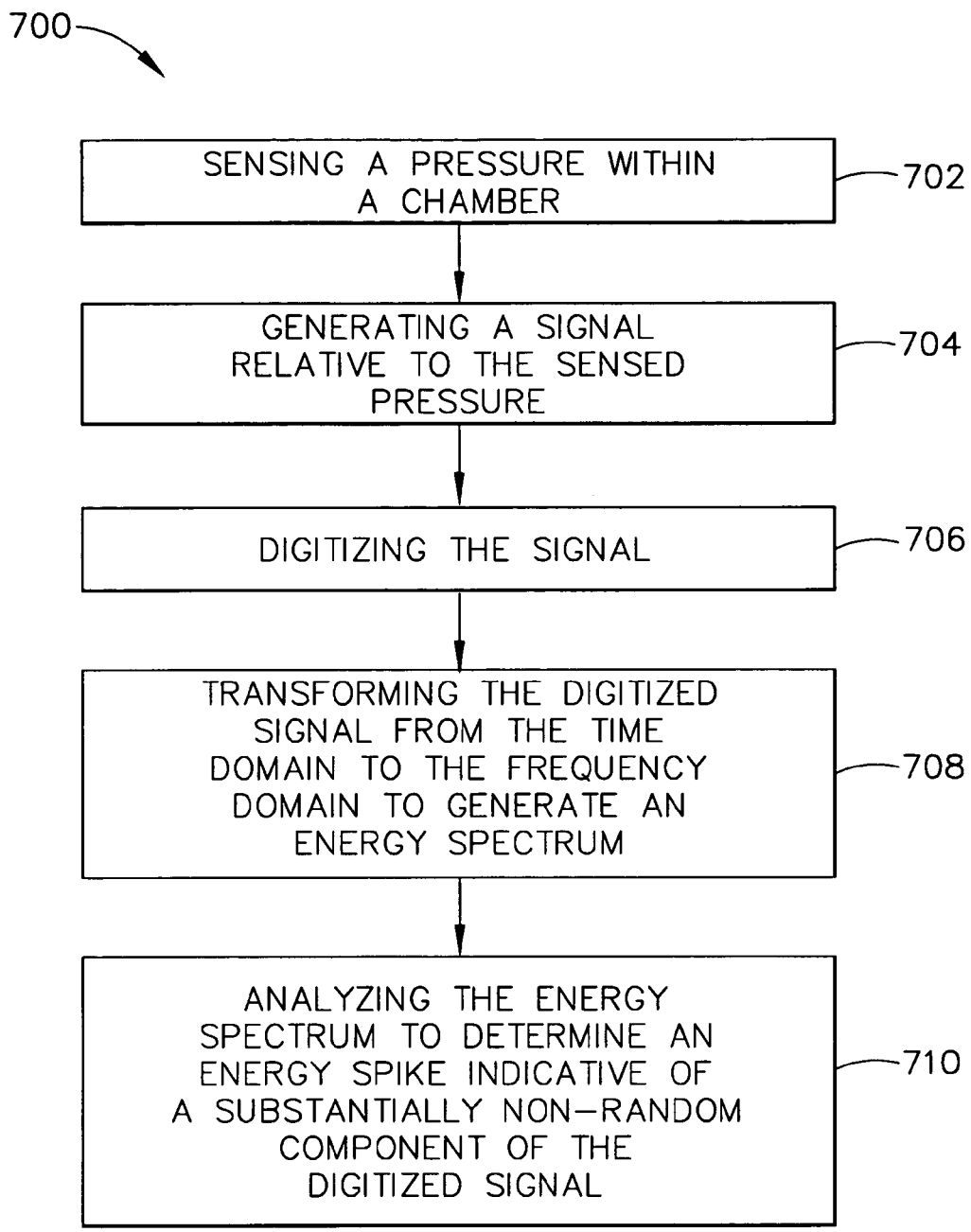
FIG. 7 is a flow diagram of an exemplary method 700 for generating a signal that is indicative of a pressure oscillation in a chamber.

FIG. 7 is a flow diagram of an exemplary method 700 for generating a signal that is indicative of a pressure oscillation in a chamber. The method includes sensing 702 a pressure within the chamber. In the exemplary embodiment, a sensor that includes a diaphragm that is sensitive to the pressure within the chamber, for example, but, not limited to a gas turbine engine combustor, and an eddy current transducer coupled to a digital eddy current system. The eddy current transducer emits RF waves from a face proximate the diaphragm such that the RF waves interact with the diaphragm to create eddy currents within the diaphragm. The eddy currents, in turn, influence the complex impedance of the transducer in relation to the gap distance between the transducer emitting face and the diaphragm. As pressure fluctuates within the combustor due to normal combustion and/or combustion instability, the output signal from the transducer varies proportionally generating 704 a signal relative to the sensed pressure. The output signal is sampled and digitized 706 by a sampling circuit and the digitized signal is transformed 708 from the time domain to the frequency domain using a FFT analyzer to generate an energy spectrum. The energy spectrum is analyzed 710 to determine an energy spike indicative of a substantially non-random component of the digitized signal. A significant portion of the signal may be due to circuit and/or component generated noise relative to the information containing portion of the signal. The noise component of the signal may be spread substantially evenly through a plurality of frequencies. A repetitive signal, such as a signal generated by humming in the combustor is generally substantially centered at one or more characteristic frequencies. A fast Fourier transform of the signal may display the energy contained within each frequency level of the signal for a plurality of frequencies. The FFT has the effect of accentuating the non-random components of the signal relative to the noise or random components of the signal, such that, in the exemplary embodiment, small signal strengths due to humming and riding on a larger noisy static pressure signal may be processed to yield significant information regarding the operation of the combustor.

Humming in a gas turbine engine may be detected by measuring relatively small, non-random oscillations of dynamic pressure within an engine combustor. Non-random oscillations occurring at a determinable frequency may be monitored using the digital eddy current system and the FFT analyzer to determine the spectral output of the engine combustors. Variations from a monitored spectrum may be determined to be humming or an onset of humming. Variations may appear as peaks in the spectral amplitude that change with operational parameters, such as, but, not limited to engine load, engine airflow, fuel quality, or inlet air temperature.

The above-described methods and system provide a cost-effective and reliable means for measuring combustor dynamic pressure variations known as humming. More specifically, the methods and system facilitate utilizing an eddy current transducer to measure proximity and/or vibration of a pressure sensor diaphragm and process the sensor output signal using a FFT analyzer to determine a non-random frequency component of the signal that may be indicative of engine humming. As a result, the methods and system described herein facilitate monitoring equipment in a cost-effective and reliable manner.

While the present invention is described with reference to measuring humming in a gas turbine engine, numerous other applications are contemplated. For example, it is contemplated that the present invention may be applied to any system wherein a relatively small non-random frequency signal may be affected by a noise floor that at least partially obscures the signal, such as, but not limited to, process system measurements and instrumentation systems.

Exemplary embodiments of pressure measurement systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for generating a signal indicative of a pressure oscillation in a chamber, said method comprising:
    sensing deflection of a diaphragm coupled in fluid communication with the chamber to determine a pressure within the chamber;
    generating a signal that is relative to the sensed pressure;
    digitizing the signal;
    transforming the digitized signal from a time domain to a frequency domain to generate an energy spectrum; and
    analyzing the energy spectrum to determine an energy spike indicative of a substantially non-random component of the digitized signal.

2. A method in accordance with claim 1 wherein sensing deflection of a diaphragm coupled in fluid communication with the chamber comprises sensing deflection of the diaphragm using an eddy current sensor.

3. A method in accordance with claim 1 wherein the chamber is a combustor and wherein sensing a pressure within the chamber comprises sensing a dynamic pressure indicative of humming within the combustor.

4. A method in accordance with claim 1 wherein the sensed pressure includes a static pressure component and a dynamic pressure component and wherein generating a signal that is relative to the sensed pressure comprises generating a signal relative to the dynamic pressure component.

5. A method in accordance with claim 4 wherein generating a signal that is relative to the dynamic pressure component comprises generating an analog electrical signal relative to the dynamic pressure component.

6. A method in accordance with claim 1 wherein digitizing the signal comprises periodically sampling the signal using an analog-to-digital converter.

7. A method in accordance with claim 6 wherein digitizing the signal further comprises convolving the digitized signal.

8. A method in accordance with claim 1 wherein transforming the digitized signal from the time domain to the frequency domain comprises applying a Fourier transform to the digitized signal.

9. A method in accordance with claim 1 wherein transforming the digitized signal comprises transforming the digitized signal in real-time.

10. A method in accordance with claim 1 wherein transforming the digitized signal from the time domain to the frequency domain comprises:
    converting the digitized signal into an analog signal using a digital-to-analog converter; and
    applying a Fourier transform to the analog signal.

11. A method in accordance with claim 1 wherein analyzing the energy spectrum comprises:
    determining a signal energy spike amplitude at a predetermined frequency of the energy spectrum, the frequency correlative to a combustor humming frequency;
    comparing the spike amplitude to a predetermined threshold energy amplitude limit; and
    reducing humming based on the comparison.

12. A method in accordance with claim 1 wherein analyzing the energy spectrum comprises:
    determining a signal energy spike amplitude at a frequency of the energy spectrum;
    comparing the spike to a predetermined threshold energy amplitude limit corresponding to the respective frequency; and
    reducing humming based on the comparison.

13. A method in accordance with claim 1 wherein the signal includes a noise component and a repetitive signal component and wherein analyzing the energy spectrum comprises amplifying the repetitive signal component while not substantially amplifying the noise component.

14. A system for generating a signal indicative of a pressure oscillation in a chamber, said system comprising:
    a sensor positioned in fluid communication with the chamber, said sensor configured to generate an output signal relative to pressure within the chamber, wherein said sensor comprises one of a diaphragm and an eddy current transducer;
    a sampling circuit configured to periodically receive the output signal, said sampling circuit configured to digitize the received signal; a Fourier transform circuit configured to generate an energy spectrum of the digitized signal; and an analyzer configured to process the energy spectrum to determine an energy spike indicative of a substantially non-random component of the digitized signal.

15. A system in accordance with claim 14 wherein said sensor is configured to deflect relative to a pressure variation within the chamber.

16. A system in accordance with claim 15 wherein said sensor further comprises a transducer configured to generate an output signal relative to the deflection.

17. A system in accordance with claim 14 wherein the chamber is a combustor and wherein said sensor is configured to sense a dynamic pressure indicative of humming within the combustor.

18. A system in accordance with claim 17 wherein the combustor includes a static pressure component and a dynamic pressure component and wherein said sensor is configured generate a signal relative to the dynamic pressure component.

19. A system in accordance with claim 14 wherein said sampling circuit comprises an analog-to-digital converter.

20. A system in accordance with claim 14 wherein said sampling circuit is coupled to a convolution circuit that is configured to generate a complex impedance value relative to the sensor output signal.

21. A system in accordance with claim 14 wherein said analyzer is configured to:
   determine a signal energy spike amplitude at a predetermined frequency of the energy spectrum, the frequency correlative to a combustor humming frequency;
   compare the spike amplitude to a predetermined threshold energy amplitude limit; and
   employ the comparison to facilitate reducing humming.

22. A system in accordance with claim 14 wherein said analyzer is configured to:
   determine a signal energy spike amplitude at a frequency of the energy spectrum;
   compare the spike to a predetermined threshold energy amplitude limit corresponding to the respective frequency; and
   employ the comparison to facilitate reducing humming.

23. A system in accordance with claim 14 wherein the signal includes a noise component and a repetitive signal component and wherein said analyzer is configured to amplify the repetitive signal component while not substantially amplifying the noise component.

24. A system for generating a signal indicative of humming in a gas turbine combustor, said system comprising:
   a sensor positioned in fluid communication with the chamber, said sensor comprising:
      a diaphragm configured to deflect relative to a pressure variation within the chamber, and
      an eddy current transducer configured to generate an output signal relative to the deflection;
   a sampling circuit comprising an analog-to-digital converter, said sampling circuit configured to:
      periodically receive the output signal, and
      digitize the received signal;
   a convolution circuit configured to generate a complex impedance value relative to the sensor output signal;
   a Fourier transform circuit configured to generate an energy spectrum of the digitized signal; and
   an analyzer configured to process the energy spectrum, said analyzer configured
      determine a signal energy spike amplitude at a frequency of the energy spectrum;
      compare the spike to a predetermined threshold energy amplitude limit corresponding to the respective frequency; and
      employ the comparison to facilitate reducing humming.

25. A system in accordance with claim 24 wherein said analyzer is configured to determine a signal energy spike amplitude at a predetermined frequency of the energy spectrum, the frequency correlative to a combustor humming frequency.

26. A system in accordance with claim 24 wherein the signal includes a noise component and a repetitive signal component and wherein said analyzer is configured to amplify the repetitive signal component while not substantially amplifying the noise component.

* * * * *

UNITED STATES PATENT AND TRADEMARK OFFICE
CERTIFICATE OF CORRECTION

| | | |
|---|---|---|
| PATENT NO. | : 7,113,873 B2 | Page 1 of 1 |
| APPLICATION NO. | : 10/723969 | |
| DATED | : September 26, 2006 | |
| INVENTOR(S) | : Hoyte et al. | |

It is certified that error appears in the above-identified patent and that said Letters Patent is hereby corrected as shown below:

In Claim 24, column 12, line 21, after "said analyzer configured" insert -- to: --.

Signed and Sealed this

Twenty-seventh Day of November, 2007

JON W. DUDAS
*Director of the United States Patent and Trademark Office*